US011199900B2

(12) United States Patent
Dey et al.

(10) Patent No.: US 11,199,900 B2
(45) Date of Patent: Dec. 14, 2021

(54) MODIFYING A COMPUTER-BASED INTERACTION BASED ON EYE GAZE

(71) Applicant: International Business Machines Corporation, Armonk, NY (US)

(72) Inventors: Kuntal Dey, New Delhi (IN); Anil U. Joshi, New Delhi (IN); Puthukode G. Ramachandran, Austin, TX (US); Willie L. Scott, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/812,329

(22) Filed: Mar. 8, 2020

(65) Prior Publication Data

US 2020/0209962 A1 Jul. 2, 2020

Related U.S. Application Data

(63) Continuation of application No. 15/830,055, filed on Dec. 4, 2017, now Pat. No. 10,656,706.

(51) Int. Cl.
*G06F 3/00* (2006.01)
*G06F 3/01* (2006.01)
*G06K 9/00* (2006.01)
*G06K 9/62* (2006.01)
*G06N 20/00* (2019.01)

(52) U.S. Cl.
CPC ........... *G06F 3/013* (2013.01); *G06K 9/0061* (2013.01); *G06K 9/6223* (2013.01); *G06N 20/00* (2019.01)

(58) Field of Classification Search
CPC ....... G06F 3/0482; G06F 3/013; G06N 20/00; G06K 9/6223; G06K 9/0061
See application file for complete search history.

(56) References Cited

U.S. PATENT DOCUMENTS

| 5,309,185 | A | * | 5/1994 | Harper | A61B 3/032 351/202 |
| 5,500,671 | A | * | 3/1996 | Andersson | H04N 7/144 348/14.1 |
| 5,550,602 | A | * | 8/1996 | Braeuning | A61B 3/024 351/243 |
| 5,933,210 | A | * | 8/1999 | Ron | A61B 3/08 351/243 |
| 6,215,898 | B1 | * | 4/2001 | Woodfill | G06K 9/32 382/154 |
| 7,245,273 | B2 | * | 7/2007 | Eberl | G02B 27/017 345/7 |

(Continued)

OTHER PUBLICATIONS

J. Yi, et al., "Real Time Learning Evaluation Based on Gaze Tracking", 2015, 14th International conference on Computer-Aided Design and Computer Graphics, pp. 157-164.

(Continued)

*Primary Examiner* — Nicholas Augustine
(74) *Attorney, Agent, or Firm* — Law Office of Jim Boice

(57) ABSTRACT

A method modifies a user interface based on a user having nystagmus. One or more processors collect eye gaze data points of a viewer of a user interface that displays content. The processor(s) determine, based on the eye gaze data points, that the viewer of the user interface has nystagmus. Responsive to determining that the viewer of the user interface has nystagmus based on the eye gaze data points, the processor(s) modifies the user interface.

5 Claims, 6 Drawing Sheets

(56) References Cited

U.S. PATENT DOCUMENTS

| | | | |
|---|---|---|---|
| 7,267,439 B2* | 9/2007 | Toshima | A61B 3/0033 351/223 |
| 7,309,128 B2* | 12/2007 | Cappo | A61B 3/024 351/224 |
| 8,566,152 B1 | 10/2013 | Shaw | |
| 9,704,183 B2 | 7/2017 | Lieberman | |
| 10,620,700 B2* | 4/2020 | Publicover | G06F 3/012 |
| 10,884,577 B2* | 1/2021 | Palti-Wasserman | G06F 3/017 |
| 2002/0101568 A1* | 8/2002 | Eberl | G02B 27/0172 351/211 |
| 2004/0057013 A1* | 3/2004 | Cappo | A61B 3/024 351/224 |
| 2005/0175218 A1* | 8/2005 | Vertegaal | A61B 3/113 382/103 |
| 2005/0206583 A1* | 9/2005 | Lemelson | A61B 3/113 345/7 |
| 2006/0028400 A1* | 2/2006 | Lapstun | H04N 13/344 345/8 |
| 2006/0110008 A1* | 5/2006 | Vertegaal | G06T 7/251 382/103 |
| 2007/0060390 A1* | 3/2007 | Wells | G07F 17/32 463/46 |
| 2013/0278631 A1* | 10/2013 | Border | G02C 5/143 345/633 |
| 2015/0063635 A1* | 3/2015 | Williams | G06K 9/00597 382/103 |
| 2016/0036982 A1 | 2/2016 | Ristock | |
| 2016/0132752 A1* | 5/2016 | Qvarfordt | G06K 9/6215 382/103 |
| 2017/0123492 A1* | 5/2017 | Marggraff | H04N 5/247 |
| 2017/0180882 A1* | 6/2017 | Lunner | H04R 25/505 |
| 2017/0249663 A1 | 8/2017 | Hajiyev | |

OTHER PUBLICATIONS

Kleps, Kevin. "Eye-Tracking Study Helps Indians Prove Worth to Ad Partners, but That's Just the 'Tip of the Iceberg'." Crain's Cleveland Business, May 27, 2014.

Li et al., "Towards Measuring and Inferring User Interest From Gaze." WWW '17 Companion Proceedings of the 26th International Conference on World Wide Web Companion. Apr. 3-7, 2017.

M. Sadeghi, G. Tien, G. Hamarneh, and Ms Atkins. 2009. Hands-free interactive image segmentation using eyegaze. Proc of SPIE vol. 7260: 72601H-1.

P. Mell et al., "The NIST Definition of Cloud Computing", National Institute of Standards and Technology, Information Technology Laboratory, Sep. 2011, pp. 1-7.

International Business Machines Corporation, "List of IBM Patents or Patent Applications Treated as Related", Mar. 2020.

Wikipedia, "Nystagmus".

* cited by examiner

MODIFYING A COMPUTER-BASED INTERACTION BASED ON EYE GAZE

BACKGROUND

The present invention relates to the field of computers, and particularly to computers that receive and/or transmit electronic information. Still more particularly, the present invention relates to dynamically modifying electronic information based on eye gaze.

Anticipating user interaction is an important element in human-machine interface design. Guiding a user to perform a targeted action (e.g. make a purchase, download software or follow a call-to-action) is an area of focus across industries.

The success rate of users starting and completing a target digital action can greatly depend on user experience (UX) presentation, how well information about the user is leveraged, and external factors leading up the interaction. A good example of this is online e-commerce websites. The desired target action is a user purchase. The provider of the e-commerce websites makes use of a purchase history of its user base, in addition to other metadata, in order to suggest additional products that may also be of interest to the user, with the goal of maximizing the overall purchase.

Similar practices have been applied across other enterprises, using analytics to segment a user base for delivering targeted content (which may be in the form of products or services) to increase the likelihood of a user performing a target action. Formally defined, user segmentation is the practice of dividing a user base into groups that reflect similarity among users in each group. The goal of segmenting users is to decide how to relate to users in each segment in order to maximize the value of each user to a business.

For instance, certain processes track user behavior across a number of dimensions, and apply analytics to determine the likelihood of a user completing an action, as well as to infer potential blockers to completing the action.

In such products and offerings, the inputs to the system are well-defined. Legacy metrics (for example: click-through rates, page views, view durations, etc.), coupled with any available user and demographic metadata, are used to facilitate user segmentation.

However, no system or associated method exists for using an unsupervised machine learning approach to segment (i.e., cluster) a user base population using eye gaze tracking data to infer optimal (content and format) for delivery to the user.

The present invention provides a new and useful solution of providing such a system and associated methods.

SUMMARY

In one or more embodiments of the present invention, a method modifies a user interface based on a user having nystagmus. One or more processors collect eye gaze data points of a viewer of a user interface that displays content. The processor(s) determine, based on the eye gaze data points, that the viewer of the user interface has nystagmus. Responsive to determining that the viewer of the user interface has nystagmus based on the eye gaze data points, the processor(s) modifies the user interface.

In one or more embodiments of the present invention, the modification of the user interface includes adding an explanation about the content being displayed on the user interface; changing a physical appearance of the content being displayed on the user interface, such as enlarging font size and/or changing a color and/or shading of the content; and/or adding additional content to be displayed on the user interface.

In one or more embodiments of the present invention, a computer program product includes a computer readable storage medium having program code embodied therewith, where the computer readable storage medium is not a transitory signal per se, and where the program code is readable and executable by a processor to perform a method that includes: collecting eye gaze data points of a viewer of a user interface that displays content; determining, based on the eye gaze data points, that the viewer of the user interface has nystagmus; and responsive to the determining that the viewer of the user interface has nystagmus based on the eye gaze data points, modifying the user interface.

In one or more embodiments of the present invention, a computer system includes one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method that includes: collecting eye gaze data points of a viewer of a user interface that displays content; determining, based on the eye gaze data points, that the viewer of the user interface has nystagmus; and responsive to the determining that the viewer of the user interface has nystagmus based on the eye gaze data points, modifying the user interface.

DETAILED DESCRIPTION

Figure 1:
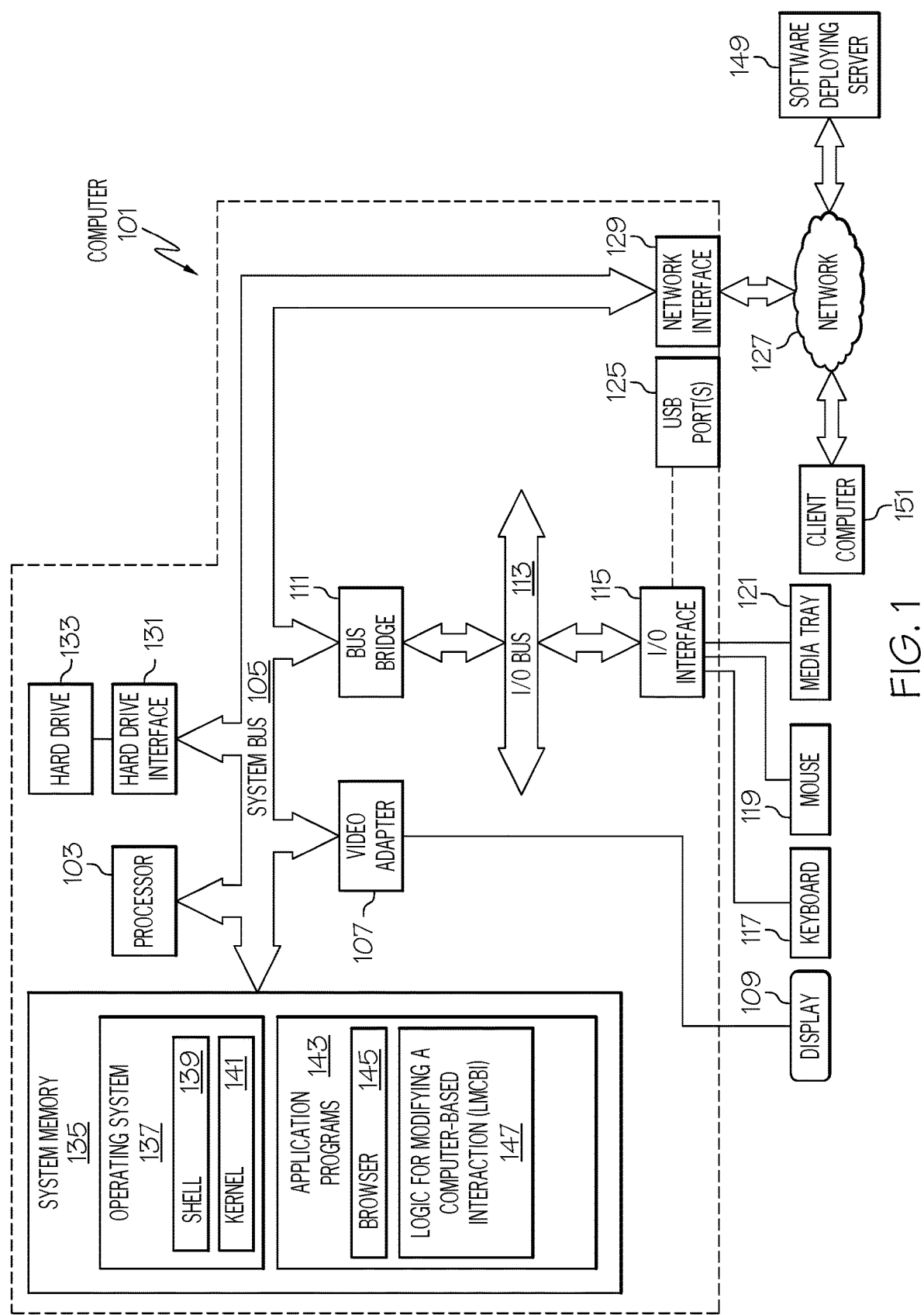
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a client computer 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Modifying a Computer-Based Interaction (LMCBI) 147. LMCBI 147 includes code for implementing the processes described below, including those described in FIGS. 2-4. In one embodiment, computer 101 is able to download LMCBI 147 from software deploying server 149, including in an on-demand basis, wherein the code in LMCBI 147 is not downloaded until needed for execution. In one embodiment of the present invention, software deploying server 149 performs all of the functions associated with the present invention (including execution of LMCBI 147), thus freeing computer 101 from having to use its own internal computing resources to execute LMCBI 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention discloses a system and associated methods for performing user segmentation using an unsupervised machine learning approach, by evaluating eye gaze data, for targeted content delivery. An exemplary embodiment of the present invention utilizes the following steps and methods.

When a user base population interacts with a computer or software program, their eye gaze data is collected to create a comprehensive corpus of information.

The user base eye gaze corpus is processed by an unsupervised machine learning algorithm to perform clustering of eye gaze data.

Once clustering is complete across the eye gaze corpus, eye gaze data, coupled with historical data on completed and failed targeted actions, are used to segment new and existing users, based on the clusters.

Once the user segmentation has been facilitated via eye gaze patterns, real-time interventions (modifications to content or format presented in the software program user experience—UX) are made possible, in order to maximize the likelihood of a user performing a target action.

The current invention utilizes the following technical components/assets/capabilities that are known in the prior art: a state-of-the-art mobile or web-based technology for capturing user eye gaze data, that does not require chin-strap calibration, such as the Eye Tracking technology; and unsupervised machine learning algorithms to perform clustering.

Figure 2:
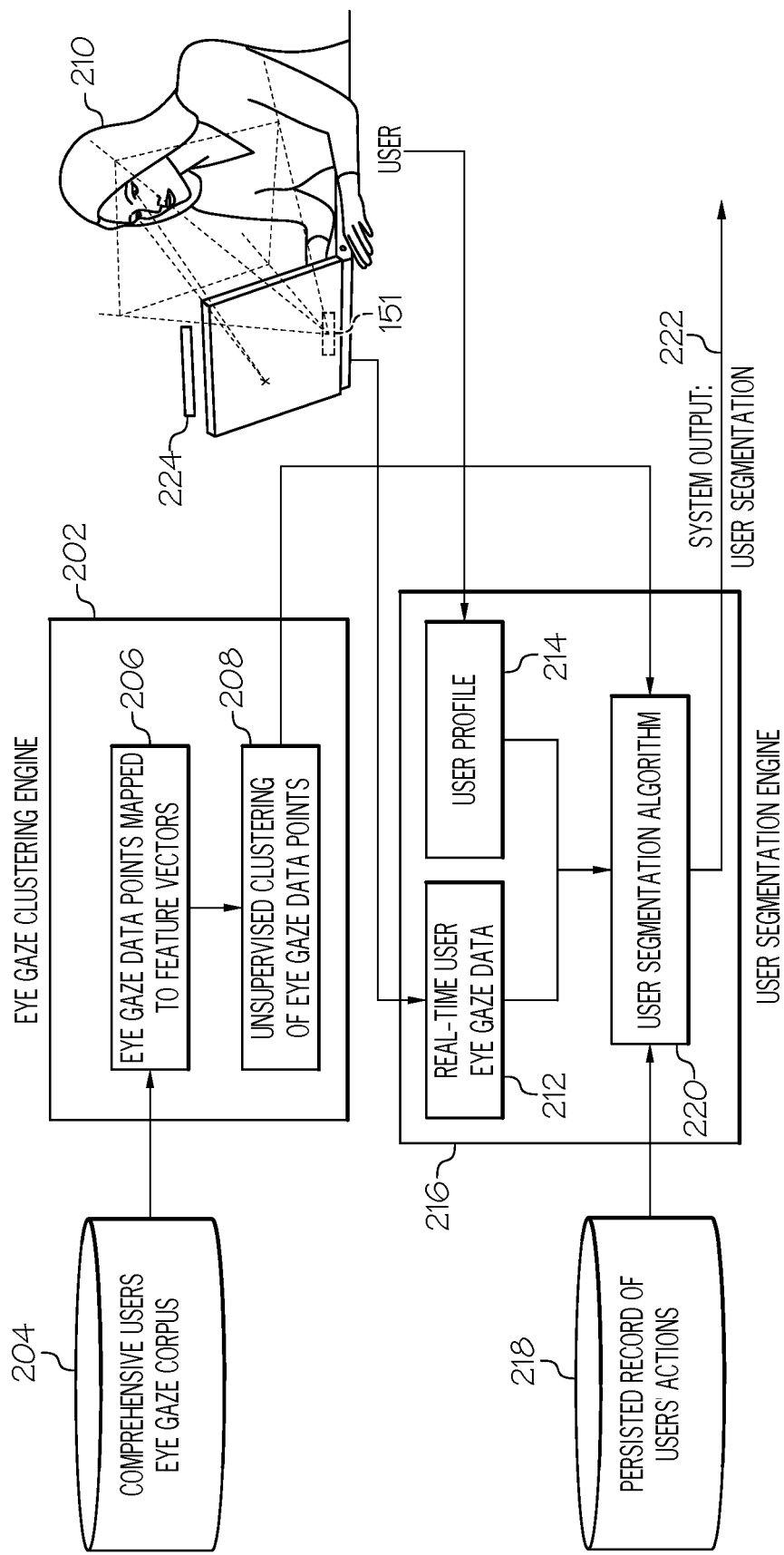
FIG. 2 illustrates a high-level overview of one or more embodiments of the present invention.

With reference now to FIG. 2, an exemplary overview of one or more embodiments of the present invention is presented. Assume that an eye gaze clustering engine 202 (i.e., part of LMCBI 147 shown in FIG. 1) has access to database 204 of comprehensive users' eye gaze corpus. That is, database 204 is a collection of past eye gazes that users have performed when looking at certain areas on a user interface (UI). The eye gaze clustering engine 202 maps eye gaze data points from database 204 to feature vectors, as shown in block 206. That is, in block 206 the eye gaze clustering engine 202 will map where past users were looking on a UI (eye gaze data points) to the content that was being displayed on the UI at the time of the gazes.

As shown in block 208, unsupervised clustering of the eye gaze data points is performed. That is, an algorithm is then run to cluster together the eye gaze data points using a machine learning algorithm (that performs unsupervised clustering) to find hidden patterns and/or groupings in the eye gaze data points.

This unsupervised clustering (segmentation) of the user base, using the eye gaze data, is performed when a user base interacts with a computer or software program. The eye gaze data is collected, using any known state of the art system, in order to collect eye gaze data used to create a comprehensive eye gaze corpus of information about the eye gazes.

Each entry of the eye gaze corpus is transformed to represent a unique data point (for instance, via a feature vector representation).

The user base eye gaze corpus is processed by a neural network employing an unsupervised machine learning algorithm to perform clustering. An exemplary unsupervised machine learning algorithm is the K-means cluster algorithm: Given a set of data points (or instances) of eye gaze data, denoted as {x1, x2, . . . , xn}, where xi=(xi1, xi2, . . . , xir) is a vector in a real-valued space uniquely representing an eye gaze data point, and r is the number of attributes (dimensions) used to describe the unique eye gaze data point, the K-means algorithm partitions the corpus of eye gaze data points into k clusters.

Once K-means clustering is complete across the eye gaze corpus, new/future user interactions with the computer or software program are monitored using legacy analytics approaches to evaluate success and failure scenarios for performing a target action. In the present invention, eye gaze data is also captured for segmenting (classifying) the user in real-time, based on the K-means clusters.

Using the correlation between successful user actions and eye gaze patterns, cluster labels are assigned to the K-means clusters in one or more embodiments of the present invention. An example of this is as follows: A group A of users exhibit an eye gaze pattern in which their gaze settles on a "save 15% off now" image, then clicks the "buy" button. A group B of users exhibit an eye gaze pattern whereby their gaze settles on "shipping costs" text, a "save 15% off now" image, then clicks the "back" button. Group A could be labeled the "Probable to Buy", and Group B could be labeled "Needs Online Chat Intervention", such that this online chat intervention occurs at or before the point of clicking the back button. This labeling of the clusters allows the system to select an appropriate cluster in order to generate an appropriate UI modification for the current user. That is, in this exemplary embodiment, Group A is assigned a system generated label by the system. Conceptually this generated label corresponds to "Probable to Buy". Similarly, Group B is assigned a system generated label that conceptually corresponds to "Needs Online Chat Intervention". For users assigned to the latter cluster, online chat intervention occurs at or before the point of clicking the back button.

In a preferred embodiment of the present invention, the user segmentation is performed automatically—human intervention is only required to observe or interpret the higher-level meaning conveyed in the resulting segmentation (i.e., to label the K-means clusters). That is, K-means clustering of a data set is unsupervised clustering, and while the K-means algorithm will group data points into clusters by a measure of "similarity", thus allowing the system to recognize similarities between the data points in a cluster.

Once the user segmentation has been facilitated via eye gaze patterns, real-time interventions or modifications to content or formatting of the computer or software program UX are made possible, to maximize the likelihood of a target action being performed.

For example, and as shown in FIG. 2, assume that a user 210 (e.g., using the client computer 151 shown in FIG. 1), has her gaze data captured (by a gaze capturing device 224) as she is looking at the screen on her client computer.

The gaze capturing device 224 is any gaze capturing device known in the prior art. For example, gaze capturing device 224 may point-map the face of user 210 in order to determine the general direction in which the user 210 is looking. The gaze capturing device 224 can then point-map the eyes of the user 210, in order to determine exactly where the user 210 is looking on the display of the client computer 151.

The real-time user gaze data is depicted in FIG. 2 as block 212. This real-time user eye gaze data (from block 212) is combined with a user profile (block 214) of the user 210 by a user segmentation engine, which may also be part of LCMBI 147 shown in FIG. 1, as part of computer 101 (i.e., a server) or as part of the client computer 151.

The user segmentation engine 216 uses the real-time user eye gaze data (block 212), the user profile (block 214), and a persisted record of users' actions (database 218) as inputs to a user segmentation algorithm (block 220).

As mentioned above, the real-time user eye gaze data (block 212) describes where the user 210 is currently looking at the UI on her computer.

The user profile (block 214) includes profile information about the user 210 such as her web search history, her product purchasing history, her medical profile (e.g., having "low vision"), her job title, etc.

The persisted record of users' actions (database 218) is a record of other users looking at the same user interface as that which user 210 is currently looking (or alternatively user interfaces that are different from what the user 210 is currently looking at) and their user actions. For example, database 218 may contain a record of other users who have looked at a particular place on the same UI that the user 210 is currently looking at. The database 218 also includes a record of what these other users did after looking at the particular place on the UI (e.g., made a purchase from a website being displayed on the UI, left the website without making a purchase, asked for additional information about a product being displayed on the particular place on the UI, etc.). Thus, database 218 provides the user segmentation algorithm 220 with information needed to generate a system output 222, which places user 210 into a particular segment of users who are known to have benefitted (e.g., by better understanding content from a webpage, by having a better user experience—UX when engaging with the UI, by receiving additional information about a product or information being displayed on the UI, etc.) by a particular modification to the UI.

Figure 3:
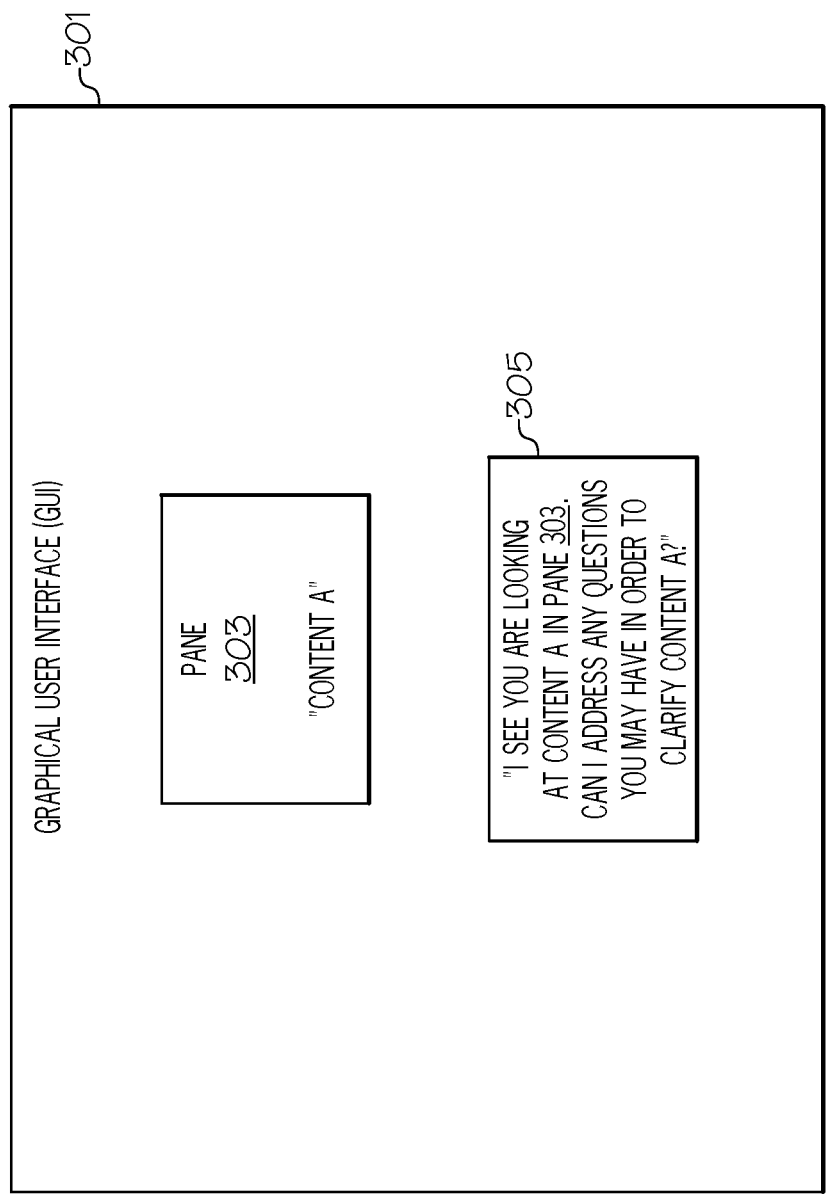
FIG. 3 depicts an exemplary computer-based interaction that has been modified in accordance with one or more embodiments of the present invention.

For example, and with reference now to FIG. 3, assume that the user 210 has looked at pane 303 on a GUI 301 on her client computer 151 (see FIG. 1). Based on the system output 222 generated in FIG. 2, the GUI 301 will be automatically enhanced with a conversational interface 305 (e.g., a chat window), that provides an intervention that offers the user the opportunity to receive real-time chat assistance, rather than leaving the webpage being displayed on GUI 301.

Figure 4:
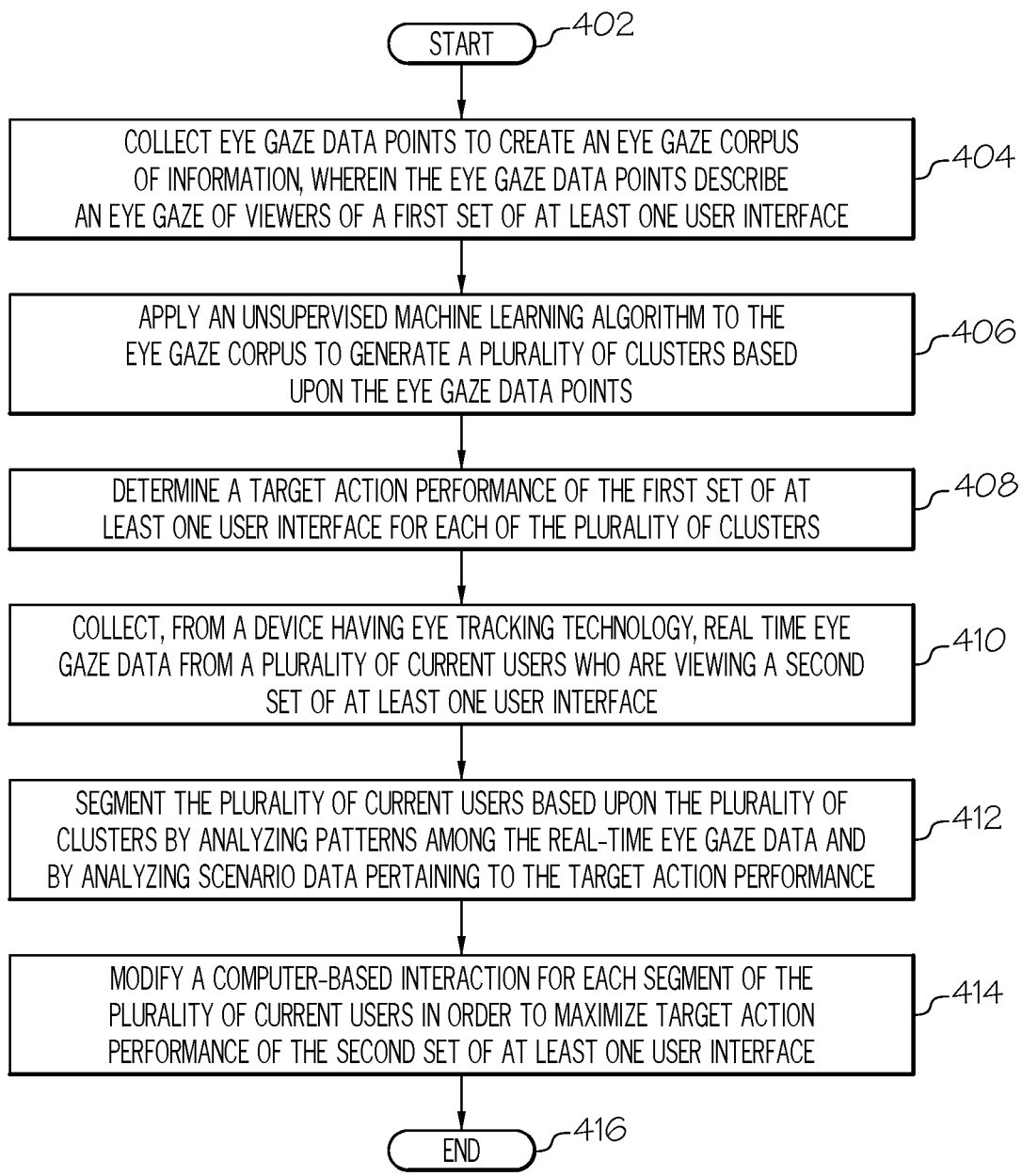
FIG. 4 is a high-level flow chart of one or more steps performed by one or more processors and/or other hardware devices in accordance with one or more embodiments of the present invention.

With reference now to FIG. 4, a high-level flow chart of one or more processes performed by one or more embodiments of the present invention to modify a computer-based interaction is presented.

After initiator block 402, one or more processors (e.g., processor 103 shown in FIG. 1) collect eye gaze data points to create an eye gaze corpus of information, as shown in block 404 and as described in FIG. 2. As described herein, the eye gaze data points describe an eye gaze of viewers of a first set of at least one user interface (i.e., eye gaze data points of past viewers of the same UI, or alternatively another UI, as that being viewed by user 210, such as those eye gaze data points found in database 204 in FIG. 2).

As described in block 406 in FIG. 4, the processor(s) apply an unsupervised machine learning algorithm to the eye gaze corpus to generate a plurality of clusters based upon the eye gaze data points. As described herein, in one embodiment of the present invention the unsupervised machine learning algorithm is a k-means clustering algorithm.

As described in block 408, the processor(s) determine a target action performance of the first set of at least one user interface for each of the plurality of clusters (a particular action that the past users wanted to perform, such as purchasing a product, understanding text better, etc. when looking at the GUI/website).

As described in block 410, the processor(s) collect, from a device having eye tracking technology (e.g., the client computer 151 being used by the user 210 in FIG. 2), real time eye gaze data from a plurality of current users who are viewing a second set of at least one user interface. That is, not only is user 210 looking at the user interface, but many other users are also looking at that same user interface. All of the users (user 210 as well as the other users) are having their eye gaze tracked by a gaze tracking device, such as the gaze tracking device 224 shown in FIG. 2.

As described in block 412, the processor(s) segment the plurality of current users (user 210 as well as the other users) based upon the plurality of clusters by analyzing patterns among the real-time eye gaze data and by analyzing scenario data pertaining to the target action performance. That is, the user segmentation algorithm 220 shown in FIG. 2 will create segments (partitions) of users into clusters, based on 1) where they are looking (the real-time eye gaze data), and 2) what target action is desired (scenario data pertaining to the target action performance).

For example, and in one or more embodiments of the present invention, the scenario data pertaining to target action performance includes historical data on failed or successful scenarios with respect to completion of at least one target action. That is, if a computer-based interaction (e.g., a client's user experience with a user interface), resulted in a successful scenario in which the user was directed to the appropriate product, received additional clarification about content shown in the user interface, etc., then that user interface is deemed to be a good fit for the current user (assuming that the current user's gaze pattern and profile matches those of other users of that user interface). However, if the computer-based interaction resulted in a failure scenario in which the user was not directed to the appropriate product, did not receive additional clarification about content shown in the user interface, etc., then that user interface is deemed to be a poor fit for the current user, and is not used to modify the current user interface for that user.

As described in block 414, responsive to the segmenting of the plurality of users, the processor(s) modify a computer-based interaction for each segment of the at least one of the plurality of users in order to maximize target action performance of the second set of at least one user interface.

The present invention provides various embodiments for modifying the computer-based interaction. For example, and in one embodiment, modifying the computer-based interaction with at least one of the plurality of users includes modifying at least one aspect of a graphical user interface of a software program, such as displaying promotional content (i.e., an advertisement or special offer for a product that is being viewed on the user interface), displaying additional clarification content related to the software program (i.e., content displayed on the graphical user interface), etc.

The flow chart shown in FIG. 4 ends at terminator block 416.

In an embodiment of the present invention, the processor(s) categorize the plurality of clusters based upon a predefined significance of one or more aspects of the segmentation. For example, assume in block 208 in FIG. 2 that the eye gaze clustering engine 202 has generated multiple clusters of eye gaze data points. However, assume further that a first set of clusters was generated based on aspect A (e.g., based on only where the users were looking), while a second set of clusters was generated based on aspect B (e.g., where the users were looking as well as their profiles). If the gaze locations are the most significant aspect used in the segmentation, then the first set of clusters are more significant than the second set of clusters, and thus are given a higher priority for use by the user segmentation engine 216 shown in FIG. 2.

In an embodiment of the present invention, the eye gaze of viewers of the first set of at least one user interface and the real-time eye gaze data from the plurality of current users who are viewing the second set of at least one user interface are based on a pathological nystagmus of the viewers of the first set of at least one user interface and the plurality of current users who are viewing the second set of at least one user interface. That is, the segmentation is based not just on where the users are looking, but how they look. More specifically, if the users have a same vision issue (e.g., nystagmus), then the system will enhance/modify the user interface not only based on where the users are looking (e.g., by adding additional content, explanations, offers, etc.), but will also enhance/modify the user interface to modify the appearance of the user interface (e.g., by automatically enlarging fonts, changing hues, etc.).

Consider now the following exemplary use case in e-Commerce for the present invention.

Assume that CompanyX is an online market place of products and services. As such, CompanyX may (or does) employ eye gaze tracking of its user base for one year, in order to cultivate a comprehensive corpus of eye gaze data (see database 204 in FIG. 2).

CompanyX then translates the eye gaze corpus into a set of data points, corresponding to feature vectors (see block 206 in FIG. 2), and utilizes K-means clustering to group similar eye gaze patterns (see block 208 in FIG. 2).

CompanyX then rolls out a limited release of new product called WidgetA. CompanyX employs eye gaze tracking of users viewing WidgetA (e.g., user 210 as well as other current real-time users), while also recording successful and abandoned purchases over a one month period.

Using the similarity of user eye gaze patterns to the K-means clusters, which are also correlated with the history of successful and failed purchases over the limited release period, CompanyX labels one K-means cluster as "most likely to buy", and another "most likely to abort".

CompanyX then rolls out WidgetA to all markets worldwide. When a new user views WidgetA, CompanyX employs eye gaze tracking to categorize (segment) the user as "requires assistance" because the user's eye gaze patterns are most similar to the "most likely to abort" K-means cluster.

Real-time intervention, in the form of chat assistance or displaying a special promotion, is performed, and the user completes the purchase of WidgetA.

Thus, as described in one or more embodiments herein, the present invention presents a system and associated methods where a user base, interacting with a computer or software program, can be automatically segmented based on eye gaze patterns. Once user segmentation is performed, real-time interventions or modifications to content or formatting of the computer or software program UX can be performed, in order to maximize the likelihood that a user will perform a target action, thus providing a technological improvement over the prior art by 1) more efficiently using computer resources when generating UX (e.g., UIs), and 2) optimizing the UX for future users.

The "gaze pattern" utilized in various embodiments of the present invention is based on content, appearance, position, and/or a combination of any or all of these factors, as well as (in one embodiment) a physical condition of the user (e.g., having a vision condition such as nystagmus, in which the eyes rapidly shift from side to side). That is, in one embodiment a user is profiled based on the type of content that the user is shown to favor based on terms that the user likes (e.g., "50% off!"), the physical appearance of the content (e.g., having a flashing red background), and/or or where the content is in the display (e.g., the right upper quadrant). In one embodiment, the physical condition of the user's eyes (e.g., having a medical condition such as nystagmus, having eyes that are drooping, thus indicating a lack of sleep, etc.) also reflect the user's "gaze pattern".

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
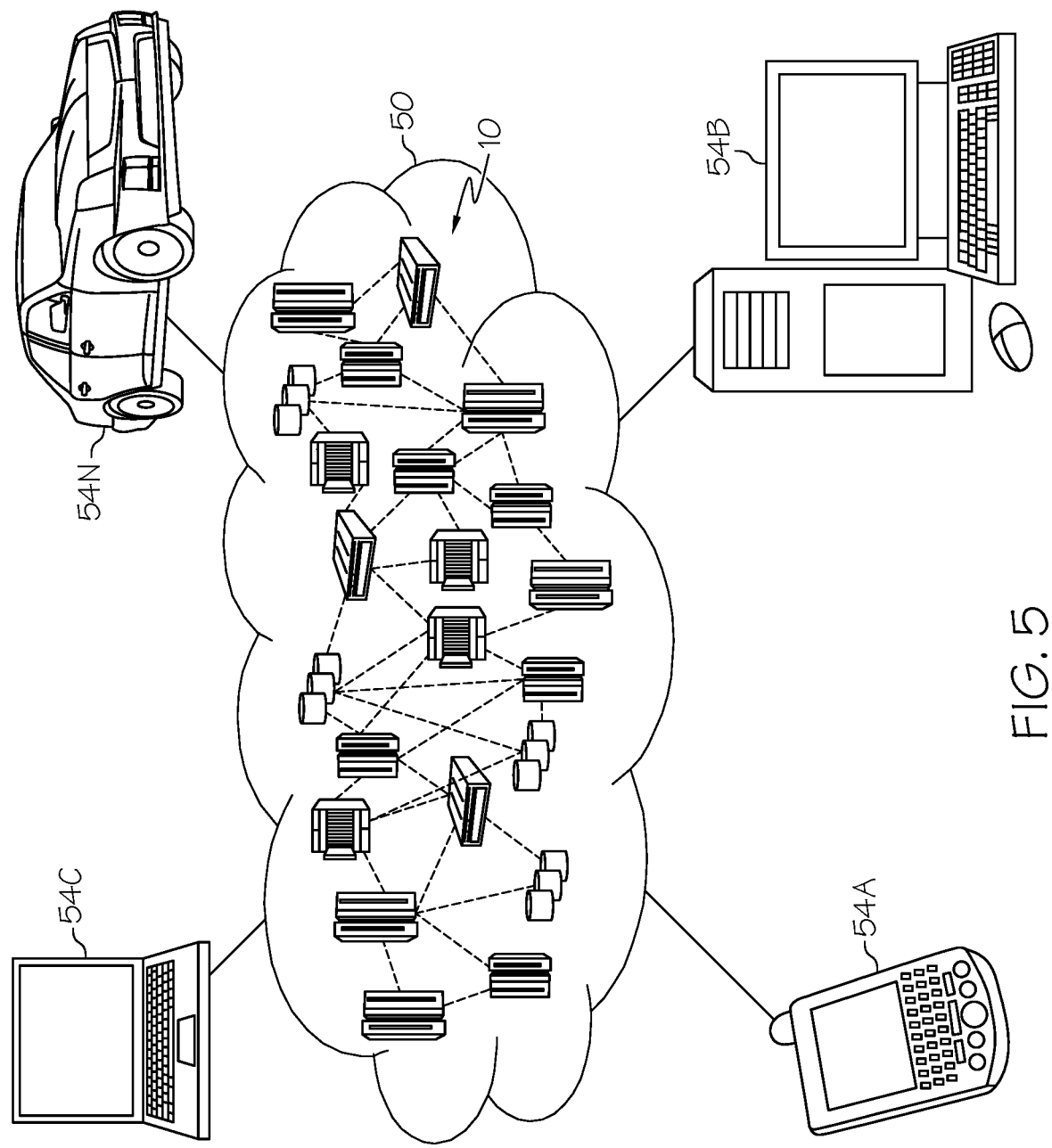
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
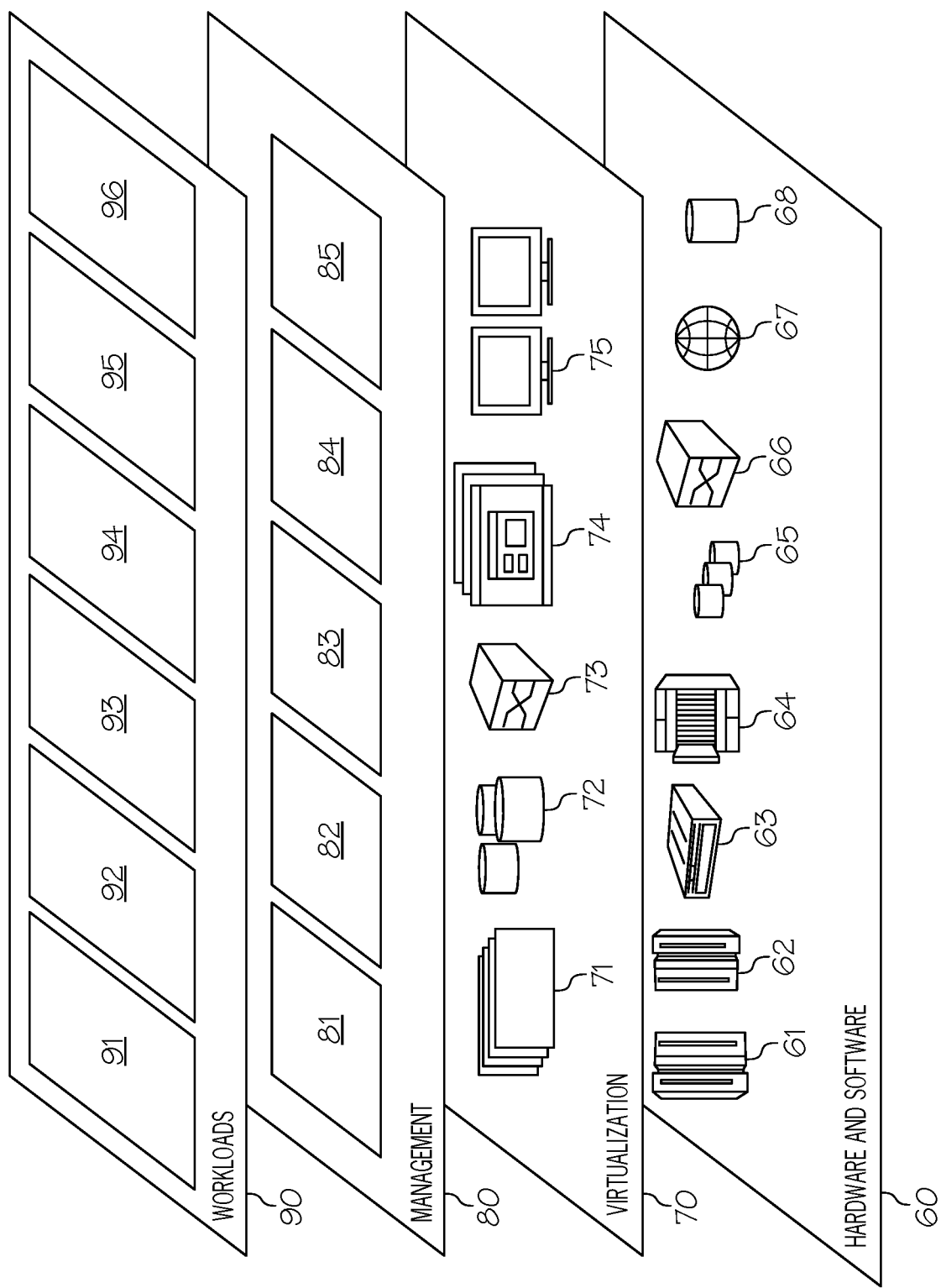
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer-based interaction modification processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    collecting, by one or more processors, eye gaze data points of a viewer of a user interface that displays content;
    determining, by one or more processors and based on the eye gaze data points, that the viewer of the user interface has a pathological nystagmus, wherein the pathological nystagmus is a pathological medical condition that causes eyes of the viewer to rapidly shift from side to side in an involuntary manner;
    applying, by one or more processors, an unsupervised machine learning algorithm to the eye gaze data points to generate a plurality of data point clusters;
    segmenting, by one or more processors, a plurality of current viewers of the user interface based upon the plurality of data point clusters by analyzing patterns among the eye gaze data points; and
    responsive to the segmenting of the plurality of current viewers, modifying, by one or more processors, a computer-based interaction for at least one segment of the plurality of current viewers.

2. A computer program product comprising a computer readable storage medium having program code embodied therewith, wherein the computer readable storage medium is not a transitory signal per se, and wherein the program code is readable and executable by a processor to perform a method comprising:
    collecting eye gaze data points of a viewer of a user interface that displays content;
    determining, based on the eye gaze data points, that the viewer of the user interface has a pathological visual condition;
    applying an unsupervised machine learning algorithm to the eye gaze data points to generate a plurality of data point clusters;

segmenting a plurality of current viewers of the user interface based upon the plurality of data point clusters by analyzing patterns among the eye gaze data points; and responsive to the segmenting of the plurality of current viewers, modifying a computer-based interaction for at least one segment of the plurality of current viewers.

3. The computer program product of claim 2, wherein the program code is provided as a service in a cloud environment.

4. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

collecting eye gaze data points of a viewer of a user interface that displays content;

determining, based on the eye gaze data points, that the viewer of the user interface has a pathological visual condition;

applying an unsupervised machine learning algorithm to the eye gaze data points to generate a plurality of data point clusters;

segmenting a plurality of current viewers of the user interface based upon the plurality of data point clusters by analyzing patterns among the eye gaze data points; and responsive to the segmenting of the plurality of current viewers, modifying a computer-based interaction for at least one segment of the plurality of current viewers.

5. The computer system of claim 4, wherein the program code is provided as a service in a cloud environment.

\* \* \* \* \*